(12) United States Patent
Danielson et al.

(10) Patent No.: US 9,189,249 B2
(45) Date of Patent: Nov. 17, 2015

(54) METHOD FOR AUTOMATICALLY DEFINING ICONS

(75) Inventors: Debra J. Danielson, Somerset, NJ (US); Miguel A. Rivera, Bronx, NY (US)

(73) Assignee: CA, Inc., New York, NY (US)

( * ) Notice: Subject to any disclaimer, the term of this patent is extended or adjusted under 35 U.S.C. 154(b) by 2002 days.

(21) Appl. No.: 11/232,135

(22) Filed: Sep. 20, 2005

(65) Prior Publication Data
US 2007/0067729 A1    Mar. 22, 2007

(51) Int. Cl.
*G06F 3/0481* (2013.01)
*G06F 9/44* (2006.01)

(52) U.S. Cl.
CPC ............... *G06F 9/4443* (2013.01); *G06F 8/36* (2013.01)

(58) Field of Classification Search
CPC ....... G06F 3/048; G06F 3/04817; G06F 8/36; G06F 9/4443
USPC .................................. 715/835, 837, 762–763
See application file for complete search history.

(56) References Cited

U.S. PATENT DOCUMENTS

| | | | | |
|---|---|---|---|---|
| 5,367,626 A | * | 11/1994 | Morioka et al. | 715/837 |
| 5,617,120 A | * | 4/1997 | Kaneko | 345/619 |
| 5,680,558 A | * | 10/1997 | Hatanaka et al. | 715/838 |
| 5,689,286 A | | 11/1997 | Wugofski | 345/348 |
| 6,031,532 A | | 2/2000 | Gourdol et al. | 345/348 |
| 7,003,736 B2 | * | 2/2006 | Kanevsky et al. | 715/837 |
| 7,225,199 B1 | * | 5/2007 | Green et al. | 707/102 |
| 7,231,611 B2 | * | 6/2007 | Kumhyr et al. | 715/837 |
| 2003/0035006 A1 | | 2/2003 | Kodosky et al. | 345/763 |
| 2005/0004770 A1 | * | 1/2005 | Ouzounian | 702/22 |
| 2005/0165712 A1 | * | 7/2005 | Araki et al. | 707/1 |
| 2006/0031048 A1 | * | 2/2006 | Gilpin et al. | 703/6 |

FOREIGN PATENT DOCUMENTS

| | | | | |
|---|---|---|---|---|
| EP | 0 939 531 A2 | 9/1999 | | H04M 1/00 |
| GB | 2 358 118 B | 2/2004 | | G06T 11/00 |
| WO | WO 2005/015389 A1 | 2/2005 | | G06F 9/44 |

OTHER PUBLICATIONS

Notification of Transmittal of the International Search Report and the Written Opinion of the International Searching Authority for International Application No. PCT/US2006/034209, 11 pages, Nov. 10, 2006.

* cited by examiner

*Primary Examiner* — Amy Ng
*Assistant Examiner* — Sajeda Muhebbullah
(74) *Attorney, Agent, or Firm* — Baker Botts L.L.P.

(57) ABSTRACT

A method for generating a graphical icon to represent a software module is disclosed. The method includes the steps of processing a description of the module stored within a database through a glossary to obtain a normalized description, parsing the normalized description to abstract the module and identify at least one component of the module, obtaining at least one icon component for the at least one module component, and assembling the at least one icon component into the graphical icon.

7 Claims, 2 Drawing Sheets

METHOD FOR AUTOMATICALLY DEFINING ICONS

BACKGROUND

1. Field

The present disclosure relates generally to creation and definition of graphical icons in graphical user interfaces, and more particularly, to a method for automatically defining icons.

2. Description of the Related Art

Graphical user interfaces (UI) are a predominant way for users to interact with software. UIs primarily consist of a plurality of graphical icons representing specific modules (e.g., functions, objects, etc.) of the software. Simplicity and functionality of UIs, and more specifically their icons, has contributed to dramatic increase in their popularity and their usage. UIs have even been implemented in enterprise level software.

Currently, software developers that create software packages consisting of multiple products, such as enterprise infrastructure management software, generally produce different icon sets for each of the products, even though the icons represent the same software modules. For instance, a "Zoom In" function within one product would be represented by an icon having a "+" within a circle, while in another product would be represented by an icon in shape of a looking glass. Different icon sets make it difficult for users of the software to interpret and learn the UIs of these products, since the same modules are represented by different icons. In addition, use of different icons to represent similar modules makes the icons less recognizable and less intuitive thereby reducing their utility in UIs.

Therefore, there is a need for a method to automatically define icons representing objects during software development based on the objects' functionality to ensure universal and/or consistent and minimal spanning icon coverage. This method would also eliminate duplicate icons and provide for more recognizable icons which are more easily learned by the users.

SUMMARY

The present disclosure provides for a method to create graphical icons for software modules. In general, a description of the software module is stored in a database and is normalized by comparing it to a set of definitions stored in a glossary. The normalized definition is then parsed to extract an object, an action, and a modifier of the module. The action is the processing call of the module performed on the object. Thereafter, the method searches an icon component library to obtain an icon component for each of the components of the modules (e.g., the object, the action, the modifier). Once the components are obtained, the components are assembled into an icon to represent the module. The icon is also stored in an icon library for subsequent use with other similar software modules.

According to one aspect of the present disclosure, a method for generating a graphical icon to represent a software module is disclosed. The method includes the steps of processing a description of the module stored within a database through a glossary to obtain a normalized description, parsing the normalized description to abstract the module and identify at least one component of the module, obtaining at least one icon component for the at least one module component, and assembling the at least one icon component into the graphical icon.

According to another aspect of the present disclosure, a set of computer-executable instructions for generating a graphical icon to represent a software module is disclosed. The computer-executable instructions includes the steps of processing a description of the module stored within a database through a glossary to obtain a normalized description, parsing the normalized description to abstract the module and identify at least one component of the module, obtaining at least one icon component for the at least one module component; and assembling the at least one icon component into the graphical icon.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described herein below with reference to the accompanying drawings. In the following description, well-known functions or constructions are not described in detail to avoid obscuring the present disclosure in unnecessary detail.

The present disclosure provides for a system and method for creating graphical icons representing modules of a software package. Modules are stored within a database which includes an abstracted module description. The method normalizes the language describing the module and defines the module abstractly as having an object, an action, (e.g., the object is data being modified by the action, action is a software function), and a modifier (e.g., an additional action which further defines the action). This permits categorization of the modules. Initially, it is determined if the module has an existing fitting icon within an icon library. If not, then for each of the module's components, the method determines if an icon component exists within an icon component library. If not, then the method creates an icon component. Thereafter, the method assembles the components to create an icon and stores the created icon components and the icon, if any, in the corresponding libraries.

Figure 1:
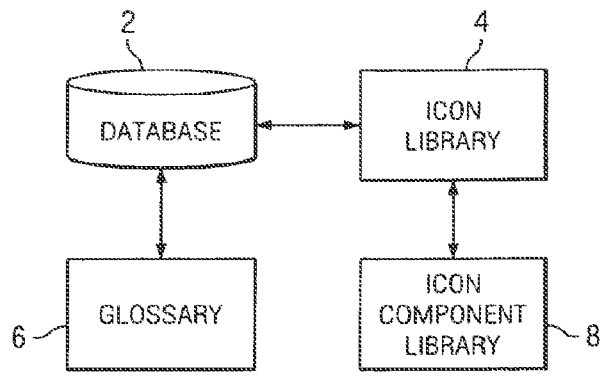
FIG. 1 is a block diagram of a system for creating graphical icons representing a software module according to the present disclosure.

Referring to FIG. 1, a system for defining graphical icons for software modules (e.g., software modules of a software package) is illustrated. A software module can include any of the following: an object, which can be any type of data structure (e.g., a document, an image, etc.), an action, which can be a function performed by the software package (e.g., open a document, scrolling through a document, etc.), and other associated activities or components (e.g., modifier, which modifies the action, object state, etc.).

Information concerning the objects, actions, modifiers, etc. is stored in a database 2, which includes the names of the objects and their description, such as their state, attributes, etc. The database 2 can be an MDB database available from Computer Associates International, Inc., located in Islandia, N.Y. MDB is an integrated database schema that stores information technology (IT) management data used by plurality of Computer Associates' products.

Generally, a software package includes a plurality of products which consist of multiple functions programmed to perform actions on objects. With regard to the MDB, any products deigned to function with the IT management include functions for manipulating the objects stored therein. Thus, a software module generally includes one or more functions which are part of a product and which are configured to perform an action on one or more objects stored in the database 2 and which may further include a modifier to modify the action.

The database 2 is connected to a glossary 6 which includes normalized language terms used to describe the software modules, which include the objects, actions, and modifiers. The glossary 6 is built from and is synchronized with the database 2 and is continuously updated as well as updates the database 2 to ensure that the descriptions of the software modules are consistent.

The software modules are assigned graphical icons based on their descriptions. Therefore, the database 2 is also connected to an icon library 4 which includes icons for software functions. An icon can be any graphical representation used to denote the software module within a graphical UI. The icon library 4 is also connected to an icon component library 8 which stores a plurality of graphical elements which may be used to create an icon.

Figure 2:
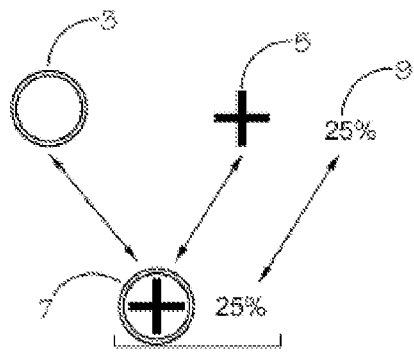
FIG. 2 is an illustration of a graphical icon.
Figure 3:
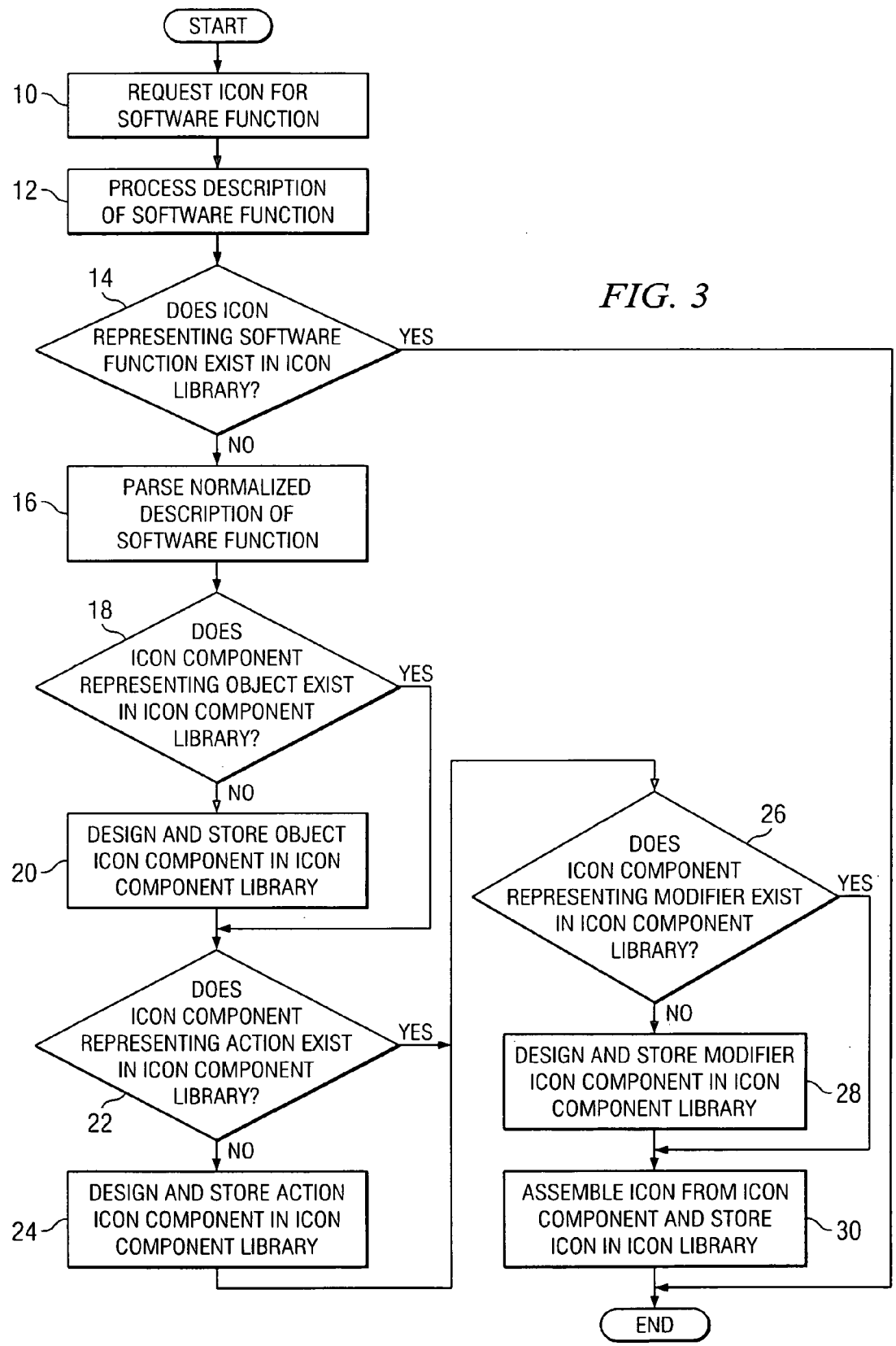
FIG. 3 is a flow diagram of a method for creating graphical icons according to the present disclosure.

FIG. 3 shows a method for creating icons representing software functions which will be discussed in conjunction with FIG. 2 which shows a graphical icon for a software function designed to "increase viewing area."

It is envisioned that the method of creating icons may be utilized during product development, for instance, the software engineers request icons from a UI design team to represent newly written software modules. It is also envisioned that the present method may also be used retroactively, where a database defining software objects is synchronized with an icon library.

In step 10, a request is made for creation of an icon for a software module. The request is generally made by software development team and directed to a UI design team. The request at the minimum includes the name and description of the software module which may be obtained from generic documentation accompanying the code of the software module and is extracted from the database 2. The request is made either concurrently or after the database 2 has been updated with the information concerning the software module.

In step 12, the description and/or the name of the software module is processed, which involves parsing the description and/or name and reviewing the parsed phrases/words against the glossary 6 to obtain a normalized description. As discussed above, the glossary 6 is synchronized with the database 2. This insures that the terms contained within the glossary 6 allow for consistent comparisons of terms within the glossary 6 with the parsed terms of the software module description.

For instance, the software developer uses a phrase "enlarge viewing area of a window by twenty five percent" to describe a module. The words of the description would be parsed and compared with the glossary 6, where, for instance, a word "increase" is used to replace "enlarge" and the words "of a window" are truncated, "twenty five percent" is replaced by a numerical notation of "25%," resulting in a normalized description "increase viewing area by 25%." Thus, when another software module for increasing viewing area by 25% is created but has a different description, e.g. "expand window by one fourth," this description will be parsed and replaced with the same normalized description, e.g., "increase viewing area by 25%."

In step 14, the method determines whether the icon library 4 already includes an icon which would fit the normalized description of the software module. It is envisioned that in large scale software packages various teams of software developers have previously written modules designed to accomplish the same tasks. Such modules already have icons stored within the icon library 4; therefore, if the newly requested module matches in functionality, then the same icon will be used to represent the new task.

For instance, if the module described as "expand window" already has an icon and another module for "increasing viewing area of a window" subsequently requests an icon, then the subsequent module will be assigned the previously created icon. This allows for recycling of previously created icons which in turn saves resources and allows for creation of consistent or universal UIs. If an icon which would fit with the description of the module already exists, then the process ends. If not then the method proceeds to step 16.

In step 16, the normalized description of the software module is parsed to obtain an abstracted structure thereof. The software module, in an abstracted form, generally includes an object, an action (e.g., function), and, possibly, a modifier. The object is a component (e.g., document, image, screen, etc.) of the software module upon which the action (e.g., function) acts. The modifier typically further defines or sets parameters for the action or, alternatively, may be an additional action. For instance, with reference to the above example, the software module for "increasing the viewing area by 25%" relates to an object "viewing area" with an action "increase." The modifier for the above module is the amount by which the viewing area is increased (e.g., 25%). The abstraction allows for easier categorization of the software modules which facilitates selection and/or creation of corresponding icons.

After the object, the action, and the modifier are parsed, corresponding icon components for each of these components are obtained from the icon component library 8 or are designed anew if the icon components are not available. In step 18, the icon component library 8 is searched and it is determined whether an icon component for the object exists in the icon component library 8. Referring once again to the above example, the object "viewing area" has been previously used by another module; hence, an icon component already exists in the icon component library 8 which could represent the current object. If an icon component is not found, then in step 20 an icon component for the object is designed and added to icon component library 8. For exemplative purposes, the "viewing area" object may be represented by the circle symbol, "○" (identified by reference numeral 3 in FIG. 2).

In step 22, the icon component library 8 is searched for an icon component to represent the action component of the module and it is determined whether such an icon component exists. If not, then in step 24 a corresponding icon component is designed and stored in the icon component library 8. Referring to our previous example, the "increase" action may be represented by a "+" symbol (identified by reference numeral 5 in FIG. 2).

In step 26, the searching process is repeated for a modifier component. The icon component library 8 is searched to find a corresponding icon component to represent the modifier and it is determined whether the icon component exists. If not, then in step 28 the icon component is designed and stored in the icon component library 8. In the example, the increase "by 25%" is represented by the symbol "25%" (identified by reference numeral 9 in FIG. 2).

Once the icon components have been obtained from the icon component library 8 or designed, in case they did not exist, then, in step 30, the individual icon components representing the object, the action, and the modifier are assembled into a single icon representing the software module. In addition, the newly created icon is also stored in the icon library 4. As shown in FIG. 2, the circle "○" symbol 3, "+" symbol 5, and 25% symbol 9 are combined to create an icon 7 (e.g., ○+25%) representing the module "increase viewing area by 25%" An alternative icon 7 may be "○+25%". It is also envisioned that the modifier component 9 may be stored or referenced as "δ%" where "δ" is the specific variable (e.g., 25, 50, 75, etc.) selected by the user.

Figure 4:
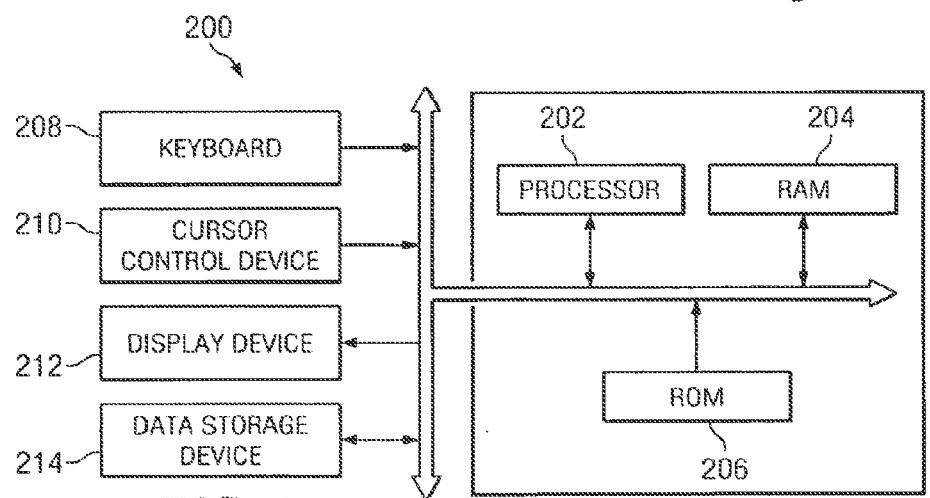
FIG. 4 is an exemplary computer system for implementing various embodiments of the methods of the present disclosure.

Referring to FIG. 4, the process as described in the present disclosure may be adapted as computer-executable instructions stored on a computer-readable media, e.g., data storage device 214 such as a hard drive, magnetic media, optical media, etc., or in read only memory (ROM) 206 of a computer system 200. The computer system 200 comes equipped with a processor 202 and random access memory (RAM) 204. In additional, the computer system 200 is configured with a keyboard 208, mouse or other pointing device 210 and a display 212.

The computer-executable instructions may be loaded from the data storage device 214 to RAM 204 from which the processor 202 reads and executes each instruction, or the processor may access and execute the instructions directly from ROM 206 depending on the manner in which the instructions are stored. Additionally, the data storage device is used to store database 2, glossary 6, the icon library 4, and the icon component library 8 as well as temporary and final results produced by the process as described above. The software module to be processed to generate a corresponding icon may be selected through a combination of keystrokes on the keyboard 208 and manipulation of the pointing device 210, as known in the art. The display device 212, ideally, provides a graphical interface allowing easy visualization of the file storage structure of the data storage device 214 as well as a graphical representation of the process outputs during and after execution. It is also envisioned that the current method may be used with a plurality of computer systems 200 arranged in a network (e.g., LAN, WAN, wireless, etc.).

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A method for generating a graphical icon to represent a software module, the method comprising the steps of:
   selecting a first software module from a plurality of software modules;
   processing a first description of functionality of the first software module through a glossary to obtain a first normalized description, wherein the first description of functionality is stored within a database;
   parsing the first normalized description to abstract the first software module and identify first module components, wherein the first module components comprise a first action, a first object upon which the first action is performed, and a first modifier that modifies the first action;
   generating an icon component for each of the first module components and saving the icon component in an icon component library;
   obtaining the icon component from the icon component library for each of the first module components, respectively; and
   assembling the icon components into a combination icon;
   storing the combination icon in a combination icon library;
   selecting a second software module from the plurality of software modules;
   processing a second description of functionality of the second software module through the glossary to obtain a second normalized description;
   retrieving the combination icon from the combination icon library;
   using the combination icon to accurately represent the second normalized description of the second software module to standardize the combination icon across the first and second software module.

2. The method according to claim 1, wherein the obtaining step includes determining whether there is a combination icon suitable to the first normalized description of the first software module in the combination icon library.

3. A set of computer-executable instructions encoded in a non-transitory computer readable medium for generating a graphical icon to represent a software module, the computer-executable instructions comprising the steps of:
   selecting a first software module from a plurality of software modules;
   processing a description of functionality of the first software module stored through a glossary to obtain a normalized description, wherein the description of functionality is stored within a database;
   parsing the normalized description obtained by the processing to abstract the first software module and identify first module components, wherein the first module components comprise an action, an object upon which the action is performed, and a modifier that modifies the action;
   generating an icon component for each of the first module components and saving the icon component in an icon component library;
   obtaining the icon component for each of the first module components, respectively; and
   assembling the icon components into a graphical icon;
   storing the graphical icon in a graphical icon library;
   selecting a second software module from the plurality of software modules;
   retrieving the graphical icon from the graphical icon library;
   using the graphical icon to accurately represent a second set of module components abstracted from the second software module to standardize the graphical icon across the first and second software module.

4. The computer-executable instructions according to claim 3, wherein the obtaining step includes extracting the icon component from an icon component library.

5. The computer-executable instructions according to claim 3, wherein the obtaining step includes determining whether there is an icon suitable to the normalized description of the first software module in the graphical icon library.

6. The computer-executable instructions according to claim 3, wherein the instructions are stored on a computer-readable media, said media selected from a group consisting of magnetic media, optical media, read-only memory (ROM).

7. The computer-executable instructions according to claim 3, wherein the instructions are executable by a computer system comprising a processor, a random access memory (RAM), at least one user input device, a data storage device and a graphical display device.

* * * * *